(12) United States Patent
Ouchi et al.

(10) Patent No.: US 8,514,349 B2
(45) Date of Patent: Aug. 20, 2013

(54) IMAGE DISPLAY APPARATUS AND BACKLIGHT APPARATUS USED THEREFOR

(75) Inventors: Satoshi Ouchi, Kamakura (JP); Hajime Inoue, Yokohama (JP); Hidenao Kubota, Yokoyama (JP); Mayumi Nagayoshi, Chofu (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 203 days.

(21) Appl. No.: 13/083,509

(22) Filed: Apr. 8, 2011

(65) Prior Publication Data
US 2011/0249220 A1 Oct. 13, 2011

(30) Foreign Application Priority Data

Apr. 9, 2010 (JP) ................................. 2010-090029

(51) Int. Cl.
*G02F 1/1335* (2006.01)
(52) U.S. Cl.
USPC .............................................. 349/65; 349/62
(58) Field of Classification Search
USPC ...................................................... 349/61–67
See application file for complete search history.

(56) References Cited

U.S. PATENT DOCUMENTS

| 5,130,898 | A | | 7/1992 | Akahane |
| 5,339,179 | A | * | 8/1994 | Rudisill et al. ................. 349/65 |
| 6,241,358 | B1 | | 6/2001 | Higuchi et al. |
| 6,259,854 | B1 | | 7/2001 | Shinji et al. |
| 2003/0137618 | A1 | | 7/2003 | Kim |
| 2004/0095743 | A1 | | 5/2004 | Yu et al. |
| 2005/0128374 | A1 | | 6/2005 | Furukawa |
| 2010/0103349 | A1 | * | 4/2010 | Schmidt et al. ................. 349/64 |
| 2011/0170036 | A1 | * | 7/2011 | Ishikawa et al. ................ 349/65 |
| 2011/0176089 | A1 | * | 7/2011 | Ishikawa et al. ................ 349/65 |

FOREIGN PATENT DOCUMENTS

| JP | 10-160938 A | 6/1998 |
| JP | 11-288611 A | 10/1999 |
| JP | 2001-093321 A | 4/2001 |
| JP | 2003-215351 A | 7/2003 |
| JP | 2004-265635 A | 9/2004 |
| WO | WO-2009/016965 A1 | 2/2009 |

OTHER PUBLICATIONS

Extended European Search Report, including Search Opinion, from counterpart European Patent Application No. 11161751.0, issued Jul. 31, 2012.
Office Action dated Sep. 4, 2012 for counterpart Korean Application No. 10-2011-32925.

* cited by examiner

*Primary Examiner* — Dung Nguyen
(74) *Attorney, Agent, or Firm* — Miles & Stockbridge P.C.

(57) ABSTRACT

A plurality of backlight blocks are aligned, each block includes light sources and a unit light guide plate for guiding light from the light sources to the side of a liquid crystal panel, unit diffusion patterns are formed in a zigzag alignment on the unit light guide plate and another diffusion pattern is formed on the back of the unit light guide plate. One side of the unit light guide plate is defined as a light entrance surface and LEDs as the light sources are aligned along the light entrance surface to satisfy $p \geq a \geq c$ where a indicates the size of the unit diffusion pattern in a direction orthogonal to an exit optical axis of the LEDs, c indicates the size of an LED emission surface in the direction of alignment of the LEDs, and p indicates the pitch of alignment of the light sources.

7 Claims, 4 Drawing Sheets

IMAGE DISPLAY APPARATUS AND BACKLIGHT APPARATUS USED THEREFOR

INCORPORATION BY REFERENCE

The present application claims priority from Japanese application JP2010-090029 filed on Apr. 9, 2010, the content of which is hereby incorporated by reference into this application.

BACKGROUND OF THE INVENTION

The present invention relates to an image display apparatus such as a liquid display device and a backlight apparatus used therefor. More particularly, the present invention relates to an image display apparatus configured to reduce a luminance non-uniformity of a so-called tandem-type backlight apparatus which is comprised of a plurality of light guide plates.

In the recent years, it is required to further reduce a thickness (i.e. a depth size) of an image display apparatus such as a liquid display device. A so-called surface light source may be used as a backlight apparatus preferable for reducing a thickness of an image display apparatus, and the surface light source is such that a linear light source or a point-like light source is converted into a surface light source by a plate-like light guide plate composed of a transparent material such as acrylic or the like. For the surface light source device there is known a tandem-type surface light source in which a plurality of light guide plates are aligned each of which guides surface light converted from light of the light source to a liquid crystal panel side. The tandem-type surface light source is formed of a plurality of light guide plates in abutting or jointing, so that a shadow, dark line or bright line occurs at the boundary between adjacent light guide plates. That is, there occurs a step of luminance between a boundary portion of the light guide plate and a portion other than the boundary portion, resulting in the cause of luminance non-uniformity on a display screen.

In order to reduce the shadow, dark line or bright line at such a boundary between adjacent light guide plates, for example, a patent document JP-A-11-288611 discloses that in a surface light source device of tandem-type in which arranged are a plurality of sets each being formed of a primary light source and light guide blocks which guide surface light converted from light of the primary light source to a liquid crystal panel side, a tip of a certain guide block is superposed on a light guide block adjacent thereto to avoid the dark line or the bright line described above.

JP-A-2004-265635 discloses that a backlight apparatus is comprised of backlight units formed of a plurality of sets, each set including a light source, a light guide plate and a reflection unit, and a transparent acrylic plate intervenes between a backlight including a guide plate, a diffuser plate and a liquid crystal panel.

However, in the backlight apparatus described in JP-A-11-288611 and JP-A-2004-265635, there may be the case where the shadow, dark line or bright line at the boundary between light guide plates can not sufficiently be reduced.

For example, when the blocks or the backlight units are aligned, there may occur that light leakage due to positional displacement of the light guide plates at the boundary of blocks or backlight units causes a bright line. Reversely, shortage of light may cause a dark line in such a structure. Furthermore, in the prior art, since the luminance is made uniform within the block, there is a possibility that the bright line at the boundary may be conspicuous rather than otherwise.

As mentioned above, the light guide plate is comprised of resin such as acrylic or the like, so that it will cause thermal expansion due to heat from a light source such as LED (light emitting diode). If the light guide plates cause thermal expansion, they interfere with each other to press each other, so that the light guide plates may suffer deformation or breakage. To avoid the possibility, there may be a structure that the light guide plates are spaced from each other with a gap of, for example, as many as 0.1 mm to a few mm to absorb the thermal expansion in light guide plates. When such a gap is provided, the shadow, dark line or bright line at the boundary between light guide plates will be much conspicuous.

In such prior art, as disclosed in JP-A-11-288611 or JP-A-2004-265635, only by superposing the light guide plates on each other or making an acrylic plate to intervene between the diffuser plate and the light guide plate, there is a possibility that the luminance non-uniformity due to dark line or bright line at the boundary between the light guide plates cannot sufficiently be reduced.

In view of the above-mentioned problem, the present invention has been made, and provides a technology which can well reduce the luminance non-uniformity caused due to a shadow, a dark line or a bright line caused at the boundary between light guide plates where a backlight unit is formed by aligning a plurality of light guide plates.

SUMMARY OF THE INVENTION

To solve the problem the present invention is featured by the configuration as defined in the claims. For example, according to one feature of the present invention a plurality of backlight blocks each including a light source and a unit light guide plate for guiding light from the light source to the side of a liquid crystal panel are aligned, unit diffusion patterns are formed on the surface of the unit light guide plate of the backlight block or on a surface opposite to the liquid crystal panel in a zigzag alignment, and further another diffusion pattern is formed on the back of the unit light guide plate or on the opposite side of the surface of the guide plate.

According to another feature of the present invention, one side of a unit light guide plate is defined as a light entrance surface, a plurality of LEDs as a light source are aligned along the one side of the entrance surface, and the relation of $p \geq a \geq c$ is satisfied, where a indicates the size of the unit diffusion pattern in a direction orthogonal to an exit optical axis of the LED, c indicates the size of a LED emission plane in the direction of a LED array and p indicates the pitch of the LED array.

On the light entrance surface of the unit light guide plate a plurality of recesses are formed as a light entrance part for entering light from the LED to the unit light guide plate. The relation of $W \geq a \geq 0.5 \times e$ may be met where W indicates the width of the recess, and e indicates the pitch of the unit diffusion patterns.

The relation of $h \geq a$ may be met further, where h indicates the distance of diffusion between the light entrance surface of a diffuser plate and the exit surface of the unit light guide plate, the diffuser plate being disposed between the unit light guide plate and the liquid crystal panel.

The unit diffusion pattern may he formed between each other of the plurality of recesses. The unit diffusion pattern may be formed of a rough surface, a minute prism unit, a convex lens or a concave lens.

According to the present invention, a contrasting pattern is formed on a screen by unit diffusion patterns which are formed on the surface of the light guide plate in a zigzag alignment. As a result, the luminance non-uniformity due to a shadow, dark line or bright line caused at the boundary between light guide plates can be made inconspicuous.

Other objects, features and advantages of the invention will become apparent from the following description of the embodiments of the invention taken in conjunction with the accompanying drawings.

DESCRIPTION OF THE EMBODIMENTS

Description of a backlight apparatus according to the present embodiment will be made in detail with reference to FIG. 1 to FIG. 7.

Figure 1:
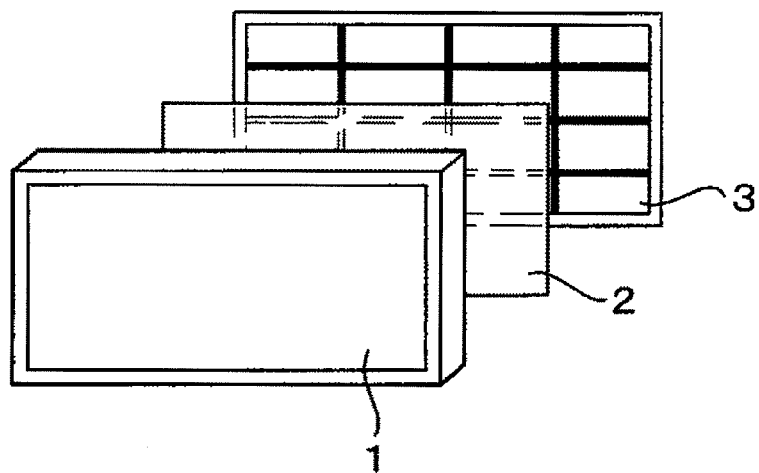
FIG. 1 is an exploded view showing the outline of the whole structure of a liquid crystal display (LCD) including a backlight apparatus according to an embodiment of the present invention.
Figure 2:
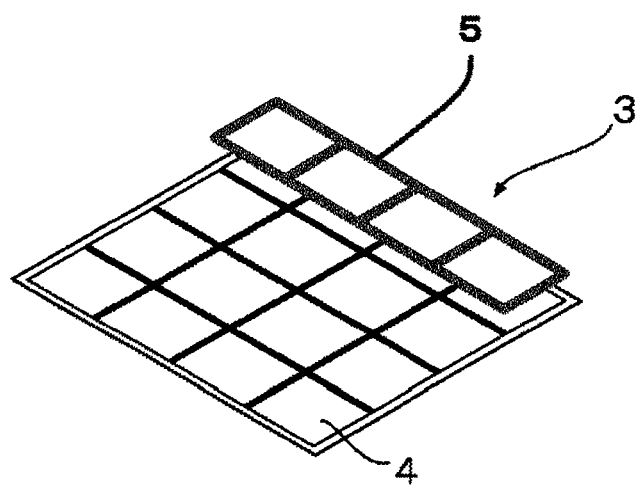
FIG. 2 is a view of backlight blocks into which the backlight apparatus according to the embodiment is divided.
Figure 3:
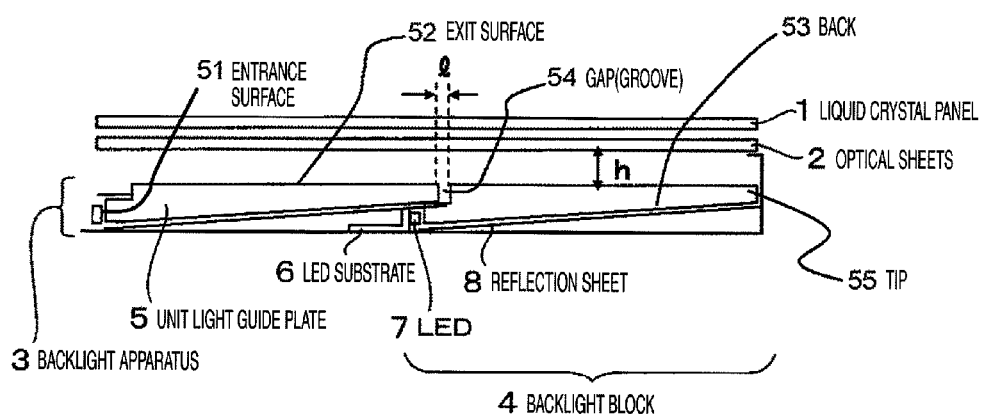
FIG. 3 is a sectional view of the inner structure of the backlight block and a liquid crystal display (LCD) including a backlight apparatus according to the present embodiment.

The outline of the whole structure will be described in which a backlight apparatus according to the present embodiment is applied to an image display apparatus with reference to FIG. 1 to FIG. 3. FIG. 1 is an exploded view showing the outline of the whole structure of a liquid crystal display (LCD) including a backlight apparatus according to an embodiment of the present invention. FIG. 2 is an outline view showing a configuration example of the backlight apparatus according to the embodiment. FIG. 3 is a sectional view of the inner structure of the backlight apparatus and a liquid crystal display (LCD) including a backlight apparatus according to the present embodiment.

As shown in FIG. 1, a transparent-type liquid crystal display (LCD) using a liquid crystal panel 1 which has prevailed as a display for image display includes as a whole constitution, a liquid crystal panel 1, optical sheets 2 which include a diffuser plate, a diffusion sheet, a polarization plate, a deflection film and the like, and a backlight apparatus 3. The backlight apparatus 3 is a so-called tandem-type surface light source device configured such that a plurality of backlight blocks 4 each having a light guide plate are arranged and combined on a plane in a matrix alignment as shown in FIG. 2, so that the backlight apparatus 3 of large scale may provide luminance uniformity. In the liquid crystal display, light is illuminated from the back side of the liquid crystal panel 1, so that the backlight apparatus 3 is required. The backlight apparatus 3 is classified into a vertical type and a side-light (edge light) type depending upon the structure of backlight apparatus. The backlight apparatus 3 according to the present embodiment is configured such that the intensity of light can be controlled for each backlight block 4 in accordance with the luminance level of an image signal, for example, making it possible to provide so-called local dimming. That is, each backlight block 4 is defined as the minimum unit of a region subjected to the local dimming. In the present embodiment, therefore, a light guide plate included in each backlight block 4 is called a unit light guide plate. In some cases, a backlight apparatus collectively including all unit light guide plates may be called merely "light guide plate".

The backlight apparatus 3 according to the embodiment of the present invention employs the side-light type and includes a plurality of divided backlight blocks 4 in structure. Referring to FIG. 3, each of the backlight blocks 4 basically includes LEDs (Light Emitting Diodes) 7 each of which is disposed on a LED substrate 6 as a light source, a unit light guide plate 5 formed of resin such as acrylic or the like and for receiving light emitted from the LED 7 and guiding the entered light to the liquid crystal panel 1 effectively, and a reflection sheet 8 provided on the back side of the unit light guide plate 5 for reflecting light from the back of the unit light guide plate 5. As shown in FIG. 2, the backlight block 4 is formed in a rectangular shape when viewed from the upper portion (that is, from the side of liquid crystal panel 1). As shown in FIG. 3, the sectional shape of the unit light guide plate 5 is a wedge-like shape in which the thickness of the light guide plate 5 gradually decreases as the light guide plate 5 is traced from an entrance surface 51 thereof toward a tip 55 opposite thereto.

As shown in FIG. 3, light from LED 7 is entered to the entrance surface 51 on a short side of the unit light guide plate 5 of rectangular shape, passes in the longer direction of the light guide plate 5 (that is, in the direction of from the left to the right on the sheet of FIG. 3), and then is reflected by a back 53 of the light guide plate 5 (the surface opposite to the reflection sheet 8) or the reflection sheet 8, exits from an exit surface 52 of the unit light guide plate 5 which is opposite to the liquid crystal panel 1 and propagates in the direction of the liquid crystal panel 1.

Further, in the present embodiment, between the exit surface 52 of the unit light guide plate 5 and the optical sheets and the like 2, that is, a light entrance surface of the diffuser plate included in the optical sheets and the like 2, provided is a diffusion distance defining a space required for diffusion of light from the exit surface 52, where the size h of the diffusion distance is as many as, for example, 1 mm to 10 mm. As mentioned above, since the unit light guide plate 5 is formed of a resin such as acrylic or the like, thermal expansion will occur due to heat of the LED 7. There is a possibility that if the unit light guide plate 5 causes thermal expansion, the unit light guide plates 5 interfere or contact with one another to collide, so that the unit light guide plates may be deformed or damaged. Therefore, a gap or groove 54 is provided between the unit light guide plates 5 with one another, thereby absorbing the thermal expansion of the unit light guide plates 5. The width 1 of the gap 54 is set to be as many as 0.1 mm to 1 mm, for example.

A plurality of LEDs 7 are aligned at an appropriate interval to the entrance surface 51 provided on the short side of the unit light guide plate 5 along its short side, that is, in the vertical or depth direction relative to the sheet of FIG. 3. Further, in the present embodiment, LED is explained as the light source. However, the light source is not limited to the LED, but it may be a fluorescent lamp or a Laser light source. LEDs may be aligned on the long side of the backlight blocks 4 of the LED 7.

As illustrated in the drawings, a plurality of unit light guide plates 5 are aligned along the long side thereof, namely, in the lateral direction of the sheet, and parts of the aligned light guide plates are overlapped with each other. For example, a tip 55 of the unit light guide plate 5 positioned on the left side of FIG. 3 is made to be overlapped on the entrance surface 51 of the unit light guide plate 5 on the right side of FIG. 3 adjacent thereto.

Next, referring to FIG. 4 and FIG. 5, description will be made of the configuration in which in the backlight apparatus according to the embodiment of the present invention, luminance non-uniformity on an image screen due to the luminance at the boundary of the backlight block 4 and the luminance at the other portion, for example, the center portion of the backlight block, is made inconspicuous.

Figure 4:
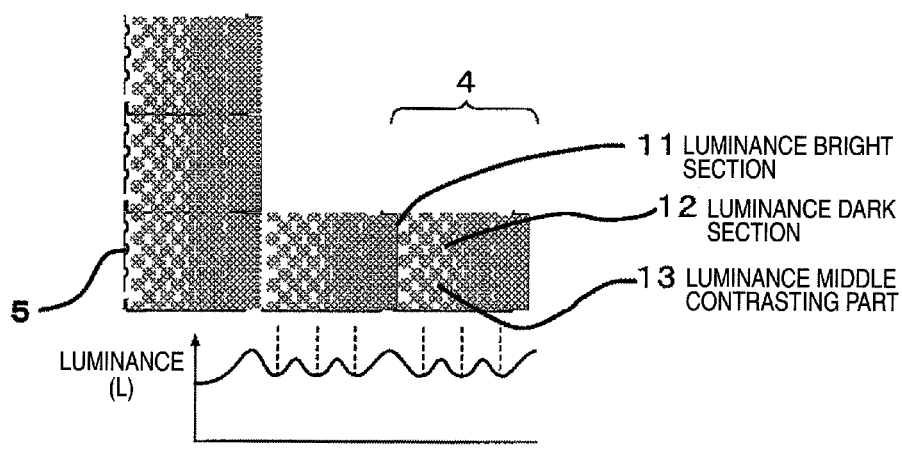
FIG. 4 is an illustration for explaining an example of patterning for intentionally generating a luminance contrast distribution from the backlight apparatus according to the present embodiment over a plurality of backlight blocks.
Figure 5:
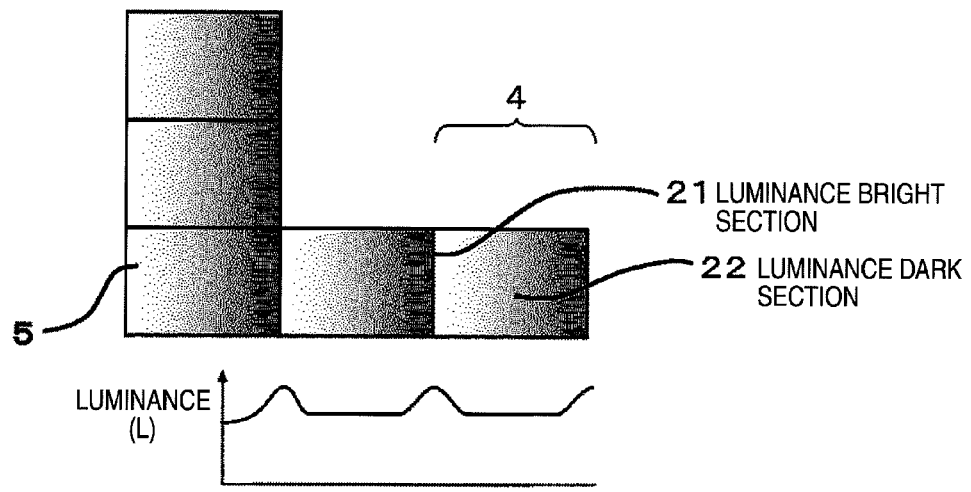
FIG. 5 is an illustration for explaining the situation of a luminance difference caused between the boundaries of backlight blocks and the inside of the backlight blocks relative to the luminance of light from the prior art backlight apparatus over a plurality of backlight blocks.

Now, a plurality of unit light guide plates 5, for example, three plates in FIG. 4 and FIG. 5, are integrally connected in the vertical direction relative to the sheet planes of FIG. 4 and FIG. 5, that is, in the direction of the short side of unit light guide plate 5, to form one slender light guide plate. The longer direction (the vertical direction on the sheet planes) of the slender light guide plate meets with, for example, the longer direction (horizontal direction) of the liquid crystal panel 1. A plurality of slender light guide plates, as shown in FIG. 3, are aligned in the transverse direction relative to the sheet plane (in the direction of the long side of unit light guide plate 5) so as to overlap parts of the slender light guide plates with each other. In FIG. 4 and FIG. 5, only the light guide plate located at the left-most side relative to the sheet plane is shown as a slender light guide plate and each of the other light guide plates is shown by only one unit light guide plate 5. Between the unit light guide plates 5 in the slender light guide plate to each other, a groove of substantially same size as the gap 54 or smaller than that size is formed. Thereby, the slender light guide plate is divided into unit light guide plates 5 each of which is a unit of local dimming.

FIG. 4 is an illustration for explaining an example of patterning for intentionally generating a luminance contrast distribution from a backlight apparatus according to the present embodiment over a plurality of backlight blocks. FIG. 5 is an illustration for explaining the manner how a luminance difference is caused between the boundaries of unit light guide plates 5 of backlight blocks 4 and a portion other than the boundaries (for example, a central portion, and the "portion other than the boundaries" is referred to as "inside" hereafter) relative to the luminance of light from the prior art backlight apparatus along an alignment of a plurality of backlight blocks. The ordinate axis in the graphs shown in FIG. 4 and FIG. 5 indicates luminance (L). The above-described luminance difference (luminance contrast difference or luminance non-uniformity) is referred to as a luminance difference when light illuminated from the backlight apparatus 3 is viewed from the exit optical side of optical sheets and the like 2 including a diffuser plate therein.

Referring to FIG. 5 of the prior art, a bright line occurs due to light leakage at the boundary between a plurality of backlight blocks 4, or between a plurality of unit light guide plates 5, to generate a luminance bright section 21 as shown in FIG. 5. Oppositely, a dark line may occur due to shortage of light. FIG. 5 exemplifies that a bright line is caused due to leakage of light.

In the inside of the unit light guide plate 5, a luminance dark section 22 is formed as shown in FIG. 5. Further, FIG. 5 shows that the luminance dark section 22 is formed in the central portion of the unit light guide plate 5. However, this means that the luminance dark section 22 is relatively dark in luminance compared with a luminance bright section 21 at the boundaries, but it does not mean that the central portion is made dark. The luminance distribution of light from the backlight block 4 in such prior art is shown in the graph on the lower side of FIG. 5, where the abscissa of the graph indicates the position on the backlight block 4. According to the luminance distribution, inconveniences have been caused such that the luminance bright section 21 at the boundaries between unit light guide plates 5 of the backlight block 4 is conspicuous compared with the luminance dark section 22 which is uniform in the inside of the unit light guide plate 5. The luminance dark section 22 is seen as a line or a grid on the screen so as to correspond to the boundary of the unit light guide plate 5. If a gap of a predetermined size is provided in the boundary portion mentioned above in order to prevent interference with each other of the unit light guide plates 5 due to thermal expansion as mentioned above, the area of luminance bright section 21 increases resultantly. The gap will increase in size because of a displacement of position or the like when assembled with the backlight block 4. As a result, the luminance bright section 21 may also increase.

In the backlight apparatus according to the embodiment of the present invention, as shown in, for example, FIG. 4, the contrast of luminance is intentionally made in the inside of unit light guide plate 5 of the backlight block 4 to make short the interval of luminance non-uniformity over the entire screen. That is, in the present embodiment, taking into account the visual property that the luminance non-uniformity is easy for a human's eye to perceive (in short, conspicuous) as the interval (period) is periodical and larger, a pattern is made for intentionally causing luminance non-uniformity between boundaries of the unit light guide plates 5 to not only generate the luminance non-uniformity on the screen irregularly compared with the case where luminance non-uniformity occurs only at the boundary of unit light guide plate 5, but also shorten the interval. Thereby, the luminance non-uniformity will be inconspicuous over the entire screen. As shown in a graph on the lower side of FIG. 4, in the pattern of luminance non-uniformity according to the present embodiment, that is, in a luminance distribution on the backlight block 4, peaks of luminance which indicate luminance bright sections occur irregularly at a short interval compared with the prior art luminance distribution shown in the graph on the lower portion of FIG. 5. In this manner, in the present embodiment, exit light from each backlight block 4 is made to provide a luminance distribution to thereby lessen bright (or dark) luminance portion of a line shape or a grid shape at the boundaries of backlight blocks 4 compared with the inside of unit light guide plate 5, making such luminance portion difficult to perceive visually.

In one example shown in FIG. 4 according to the embodiment of the present invention, in the inside of unit light guide plate 5, luminance dark sections 12 and luminance middle contrasting parts 13 (the section is somewhat dark compared with the luminance bright section 11, but is somewhat bright compared with the luminance dark section 12) are disposed alternately. That is, a contrast difference of luminance is provided in the inside of the unit light guide plate 5, and thereby the visual luminance difference with the luminance bright section 11 at the boundary of unit light guide plate 5 is lessened. When a dark line occurs at the boundary, a pattern may be provided which is darker than the uniform luminance surface of unit light guide plate 5 and is brighter than the above-described dark line in order to form the luminance contrast difference in the inside of the unit light guide plate 5 so that the dark line may be inconspicuous.

With such a structure, the luminance non-uniformity caused at the boundary between unit light guide plates can be made inconspicuous. Even when a gap for preventing interference between each other of the unit light guide plates 5 due to thermal expansion is provided at the boundary between each other of the unit light guide plates 5, the gap can suppress the luminance non-uniformity from being conspicuous.

Figure 6:
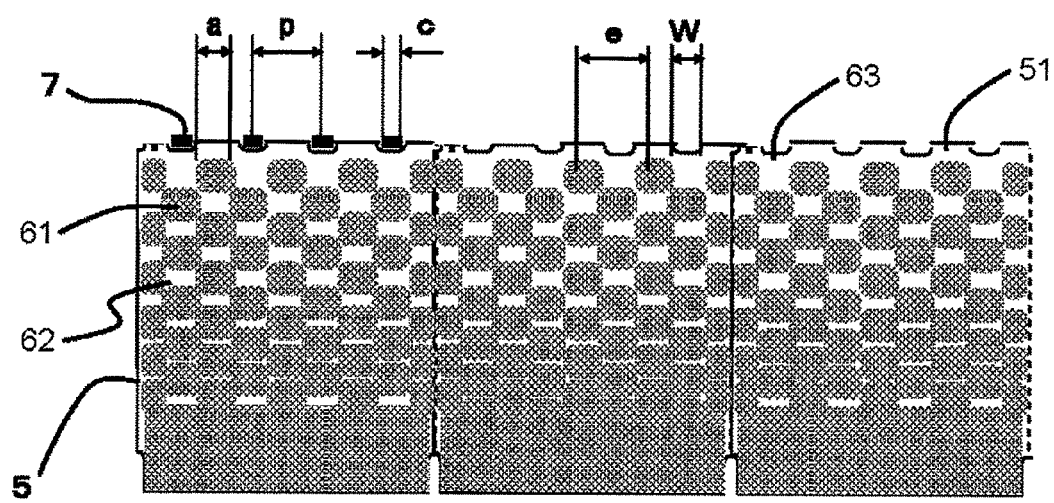
FIG. 6 is an illustration showing one example of a unit diffusion pattern formed on the surface of the unit light guide plate according to the present embodiment.

The luminance distribution according to the present embodiment mentioned above (for example, the luminance distribution shown in the graph on the lower portion of FIG. 4) can be obtained by forming a predetermined diffusion pattern on the surface of unit light guide plate 5, namely, exit surface 52. FIG. 6 shows one example of the diffusion pattern.

Figure 7:
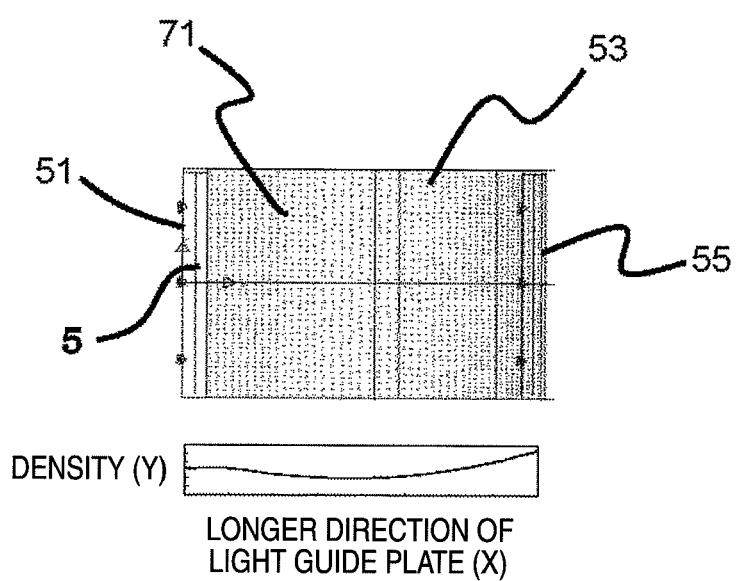
FIG. 7 is an illustration showing one example of a back pattern formed on the back of the unit light guide plate according to the present embodiment.

FIG. 6 and FIG. 7 show one example of unit diffusion pattern for generating luminance distributions according to the present embodiment in the inside of backlight block, in association with the arrangement of LEDs 7. FIG. 6 and FIG. 7 show surfaces of slender light guide plate (exit surface 52) which is constituted by connecting a plurality of unit guide plates 5.

As shown in FIG. 6, in the inside of the surface (exit surface 52) of unit light guide plate 5, a plurality of unit diffusion patterns 61 of, for example, a circular or elliptic shape or a rectangular shape having a rounded or beveled corner are formed. The unit diffusion patterns 61 are aligned in a zigzag alignment in the direction along which the LEDs 7 of unit light guide plates 5 are aligned (in the direction along the short side of unit light guide plate 5, that is, in the lateral direction on the sheet plane of FIG. 6). In other words, on the surface of unit light guide plate 5 according to the present embodiment, unit diffusion patterns 61 and non-diffusion parts 62 on which the unit diffusion patterns 61 are not formed are formed. The unit diffusion pattern 61 is constituted by, for example, finely or densely minute uneven surfaces (rough surface). Further, a plurality of the unit diffusion patterns 61 are aligned in a direction parallel with an alignment direction of LEDs 7 of unit light guide plate 5 (in the direction along the short side of unit light guide plate 5 in the present embodiment), one row of the alignment of unit diffusion patterns forms one luminance contrasting area. Two or more luminance contrasting areas are provided in the direction orthogonal to the alignment direction of LEDs 7 (in the direction along the long side of unit light guide plate 5 in the present embodiment, namely, in the light passing direction or optical axis direction). Thereby, the unit diffusion patterns 61 function to increase the quantity of light passing forward (in the direction of liquid crystal panel 1) much than the non-diffusion parts 62 surrounding the diffusion patterns 61 to provide bright luminance. In other words, the unit diffusion pattern 61 functions as a "bright section imparting element" for imparting a bright section locally to the surface of the unit light guide plate 5.

According to such a structure of the present embodiment, when considering the whole backlight apparatus 3 covering the boundary of the backlight block 4, because of presence of the luminance contrasting part formed by unit diffusion patterns 61 as the bright section imparting element, the emanating interval or period of peaks in a luminance distribution of light emanating to the front from the backlight apparatus 3 is shortened to cause unevenness or irregularity in emanation of the peak, thereby making it difficult to visually perceive the degree of luminance contrast (in short, the brightness at the boundary is not conspicuous). The unit diffusion pattern 61, as shown in FIG. 6, may be of a circle, an ellipse, a rectangular shape having rounded or beveled corners or a rectangle. The number of luminance contrasting parts of each adjacent unit light guide plate 5 (the number of the luminance contrasting parts present in the longitudinal direction on the sheet plane in FIG. 6) may be different for one another of the adjacent unit light guide plates by, for example, two and three. In other words, the unit diffusion pattern 62 which could form a luminance middle contrasting part so as to produce irregularity of luminance difference in relation to the luminance dark section 12, may take any shape and any alignment. The luminance contrasting part may comprise a first luminance contrasting part having a function of adjusting the in-surface luminance to secure the luminance uniformity of backlight block 4 and a second luminance contrasting part for canceling a bright line and a dark line due to a hot spot and a block boundary line which respectively, are continuous, thereby making the luminance non-uniformity much inconspicuous.

The unit diffusion pattern 61 mentioned above may be continuous in shape in a direction perpendicular to the LED optical axis, and further may be continuous in shape in the direction along the LED optical axis. The unit diffusion pattern 61 may be of, for example, a multiplicity of minute optical elements, in place of the above-mentioned rough surface. The minute optical element may be, for example, a minute prism, a concave lens or a convex lens or the like.

The interval between extreme points or peaks of respective luminance emanating from two or more unit diffusion patterns 61 is preferably about 0.5 mm to 30 mm. The interval between the extreme points is preferably two or more times the distance of from the surface of light guide plate 5 to the entrance surface of optical sheets and the like 2 (the entrance surface of a diffuser plate disposed at the near-most position to unit light guide plate 5). More preferably, the difference of luminance between light passing through the unit diffusion pattern 61 formed on the back of light guide plate 5 (exit surface 51) and light exited from the non-diffusion parts 62 is made by 50 percent or more than the luminance difference of light between the luminance bright section (or the luminance dark section) at the boundary of backlight block 4 and the non-diffusion parts 62. If the unit diffusion pattern 61 is formed so as to satisfy these conditions, the luminance bright section (or the luminance dark section) at the boundary of the backlight block 4 can be made inconspicuous.

When a plurality of unit diffusion patterns 61 are disposed in a direction orthogonal to the alignment direction of LEDs 7 on the surface of unit light guide plate 5, a luminance bright section (or a luminance dark section) at the boundary of backlight block 4 which emanates in the direction orthogonal to the alignment direction of LEDs 7 (in the horizontal direction on the sheet plane of FIG. 4) will be visually inconspicuous. As a matter of course, a plurality of unit diffusion patterns 61 may be provided both in the direction parallel to the alignment direction of LEDs 7 and in the orthogonal direction thereto. Further, as shown in FIG. 6, the unit diffusion pattern 61 may be configured such that the alignment pitch of the pattern gradually decreases to increase the density of the pattern as the entrance surface 51 of the unit light guide plate 5 proceeds to the tip 55 thereof. That is, light emanates more efficiently as approaching the tip of unit light guide plate 5. As a result, a function of improving the uniformity of light within the backlight block 4 is compatible with a function of making inconspicuous a portion such as the bright line and the dark line at the boundary, on which the luminance varies extremely. Thereby, light at the exit surface of light propagating through the light guide plate is preferably controlled to suppress the luminance non-uniformity.

As described above, according to the configuration of the present embodiment, not only the luminance bright section or the luminance dark section caused at the boundary of backlight block 4 can be made inconspicuous, but also the luminance bright section or the luminance dark section caused within the backlight block 4 other than the boundary due to another factor can be made inconspicuous as like. For example, as shown in FIG. 3, in the structure in which the tip 55 of any unit light guide plate 5 is overlapped on the vicinity of entrance surface 51 of the adjacent unit light guide plate 5, and LED 7 is disposed underneath the overlapped portion, a light-shielding member such as a reflection sheet 8 or the like is disposed between the back of any unit light guide plate 5 and the LED 7 to cut direct light off, thereby preventing emanation of a hot spot. At this time, if the reflection sheet 8 is thin, a hot spot of LED 7 may be visually perceived. Even in such a case, the unit diffusion patterns 61 formed in a zigzag alignment can make the luminance non-uniformity due to the hot spot rather inconspicuous.

In the present embodiment, in order to cause light entered to the unit light guide plate 5 from LED 7 to exit from the exit surface 52 substantially uniformly (that is, in order to make the luminance of exit light uniform) another diffusion pattern 71 is formed over the entire back 53 of unit light guide plate 5 as shown in FIG. 7 (hereafter, the other diffusion pattern is referred to as "back pattern 71"). FIG. 7 shows the back pattern 71 formed on the back 53 of unit light guide plate 5 and the density of the back pattern 71. In the graph of FIG. 7, the abscissa (X) indicates the direction along the longer of unit light guide plate 5 and the ordinate (Y) indicates the density of the back pattern. The density of the back pattern is adjusted to control the density appropriately along the optical axis of LED 7 between from the entrance surface of LED 7 to the tip portion 55 so as to make the luminance distribution uniform. In the example shown in FIG. 7, as shown in the graph on the lower side of FIG. 7, the density of the pattern is a little high in the vicinity of the entrance surface 51, is a little low in the central portion of unit light guide plate 5 and is most highest in the tip 55. Thereby, light is made easy to diffuse in the vicinity of the entrance surface 51 or in the vicinity of the tip 55 on which light relatively decreases, so that the quantity of light emanating to the liquid crystal panel 1 can be increased.

The back pattern 71 includes a rough surface like the unit diffusion pattern 61. Alternatively, the pattern 71 may include a large number of minute optical elements. The optical element may be, for example, a minute concave lens, minute convex lens, a minute prism, a minute truncated cone or a cone. The back pattern 71 may be formed on the back of the unit light guide plate by printing.

As described above, in the present embodiment, luminance non-uniformity is caused on the surface of the unit light guide plate 5. On the other hand, a diffusion pattern capable of equalizing the luminance distribution is formed on the back of unit light guide plate 5. Thereby, the luminance non-uniformity depending upon the optical structure of unit light guide plate 5 can be reduced with luminance non-uniformity caused due to the boundary and the gap between unit light guide plates 5 being made inconspicuous. As a result, the embodiment can provide illumination light of good backlight which is little in luminance non-uniformity and is equalized in luminance.

Subsequently, referring to FIG. 6, description will be made of the relation between unit diffusion patterns 61 formed on the light guide plate and LEDs 7 aligned on the side of the entrance surface of the light guide plate, according to the present embodiment.

In the present embodiment, as shown in FIG. 6, assuming that a indicates the size of unit diffusion pattern 61 formed on the surface of unit light guide plate 5 in the direction orthogonal to the exit optical axis of LED 7 (the size of the diffusion pattern in the direction along the short side of unit light guide plate 5 or in the alignment direction of LEDs, that is, the size in the transverse direction on the sheet plane of FIG. 6), c indicates the size of emission surface of LED 7 along its longer direction (in the direction along of the short side of unit light guide plate 5 or in the direction of alignment of LEDs 7 which is the transverse direction on the sheet plane of FIG. 6), and p indicates the pitch of alignment of LEDs 7, the relation of the following Expression is satisfied:

$$p \geq a \geq c \quad (1)$$

As indicated by the above-described Expression, by setting the size a of unit diffusion pattern 61 in the direction along the short side of unit light guide plate 5 to be greater than the size c of emission surface of LED 7, light from LED 7 which propagates within unit light guide plate 5 is securely widened, and a pseudo-emission area larger in size than the emission area of LED 7 is recreated by a bright pattern formed through the unit diffusion pattern 61, resulting in an effect as if a plurality of light sources were aligned directly underneath the diffusion pattern.

By setting the size a of unit diffusion pattern 61 in the direction along the short side of unit light guide plate 5 to be smaller than the pitch p of LED 7, it will be possible to provide a bright section or pseudo-emission section forcibly on a dark area departing from a widened light area directly after the entrance surface 51 (that is, the area between LEDs 7 from each other in the vicinity of the entrance surface 51). That is, in the present embodiment, when the pitch p of LED 7 is large, unit diffusion pattern 61 as a bright section imparting element for deriving light forcibly is provided on a portion of the light guide plate (dark section) of which luminance has been lowered because light from LED 7 is difficult to enter. Thereby the luminance non-uniformity of contrast can be converted into more definite contrast of luminance to miniaturize the contrast, making the luminance non-uniformity inconspicuous. This is similar to the phenomenon that a dot pattern looks like a uniform pattern when viewed from the remote.

In the present embodiment, the relation between the size a of the unit diffusion pattern 61 and the above-described diffusion distance h (refer to FIG. 3) satisfies Expression 2 as below:

$$h \geq a \quad (2)$$

Thereby, light of a contrasting pattern formed by the unit diffusion pattern 61 is diffused well due to the diffusion distance, and the diffused light, reflexive light reflected by a diffuser plate of optical sheets 2 and returned light are mixed, resultantly making the luminance non-uniformity inconspicuous much more.

As shown in FIG. 6, in the unit light guide plate 5 according to the present embodiment, a plurality of recesses 63 surrounding the emission surface of each LED 7 are formed along the side of entrance surface 51 of unit light guide plate 5, as an entrance section which makes easy for light from LED 7 to enter the light guide plate 5. The recesses 63 are provided by the number equal to that of LEDs. In the example of FIG. 6, four recesses 63 are disposed on the entrance surface 51 of each unit light guide plate 5. FIG. 6, for easiness of illustration, shows LEDs 7 for only the unit light guide plate 5 located on the left side of them. Of course, LEDs 7 are provided in the other unit light guide plates 5. Now assuming that W indicates the width of the recess 63 (the size in the direction of alignment of LEDs 7), and e indicates the pitch of the unit diffusion patterns 61 in the direction along the short side of unit light guide plate 5 or in the direction of alignment of LEDs 7, the relation with the size a of the unit diffusion pattern 61 satisfies the following Expression (3).

$$W \geq a \geq 0.5 \times e \quad (3)$$

Naturally when the width of recess is smaller than 0.5×e, W can substitute half the width of pitch of the recess for. At this time, the size of depth of LED is made small, thereby suppressing the quantity of light flux of exit light to render light to propagate in the direction of optical axis. In the present embodiment, there is when the width W of entrance light of the LED is greater than 0.5×e.

Thereby, a pair of a bright pattern by unit diffusion pattern 61 and a dark pattern by the non-diffusion parts 62 are present within the width W of the recess. Since the unit diffusion pattern 61 positively diffuses light to emit, the pattern 61 establishes a bright pattern. The non-diffusion parts 62 causes mainly light scattered on the exit surface side by a back diffusion pattern 71 (refer to FIG. 7) formed on back 53 of unit light guide plate 5 to emit, thereby establishing a dark pattern therein. By placing the bright pattern and the dark pattern in mixed condition within the width W of the recess 63, it will be possible to control exit light from unit light guide plate 5 or the luminance distribution thereof. In addition, as shown in Expression (3), by setting the width of the bright pattern, that is, the size a of unit diffusion pattern 61 to be equal to or greater than the width of the dark pattern, it becomes possible through the unit diffusion pattern 61 to control and increase the quantity of exit light from unit light guide plate 5.

In an over-bright section in luminance such as the vicinity of entrance surface 51, it is considered to increase the size of the dark pattern. In that case, Expression (3) will not be applicable in scope. However, for the section other than the vicinity of entrance surface 51, the luminance non-uniformity of the other section than the local section can be reduced by forming unit diffusion pattern 61 based on the Expression (3). Unit diffusion pattern 61 may be formed also in a local section between each other of recesses 63 in the vicinity of entrance surface 51. For the local section the condition of Expression (3) may not always be satisfied. However, for the other section, unit diffusion pattern 61 may be formed so as to satisfy the condition of Expression (3), thereby making it possible to suppress the luminance non-uniformity. If the width a of unit diffusion pattern is set to be equal to or smaller than the width W of recess, it becomes possible to make part of the light of LED 7 exit while making the remainder of the light propagate along the optical axis. When unit diffusion pattern 61 is configured by a multiplicity of minute prisms, minute convex lenses, minute concave lenses, cone-shaped or truncated cone-shaped minute optical elements, light can be scattered with a regular property, so improving the utilization factor of light compared with the rough surface formed by printing, and also making it possible to adjust the luminance non-uniformity suitably.

In this manner, according to the embodiment of the present invention, rectangular unit diffusion patterns 61 are formed on the surface of unit light guide plate 5 in a zigzag alignment, each pattern being, for example, a circle, ellipse, rounded or beveled rectangle in shape, thereby making it difficult to perceive luminance non-uniformity caused due to the boundary or gap between each other of unit light guide plates 5. In addition, diffusion patterns which may cause luminance non-uniformity on the surface of unit light guide plate 5 and equalize the luminance distribution on the back of the unit light guide plate are formed on the surface of unit light guide plates 5 and the back thereof, respectively, thereby making it possible to reduce the luminance non-uniformity depending upon the optical structure of unit light guide plates 5 or the like with luminance non-uniformity caused due to the boundary or gap between each other of unit light guide plates 5 being made inconspicuous. Therefore, the present embodiment can provide illumination light of a good backlight which is visually little in luminance non-uniformity and is equalized.

The luminance contrast described above is not limited to the formation using unit light guide plates 5, but it may be implemented by forming patterns on the reflection sheet 8 and/or optical sheets 2.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A backlight apparatus comprising a plurality of backlight blocks which are aligned, each block having light sources and a unit light guide plate for guiding light from the light sources to the side of a liquid crystal panel, further comprising:
   unit diffusion patterns formed on a light exit surface of the unit light guide plate of the backlight block in a staggered alignment; and
   another diffusion pattern formed on the back of the unit light guide plate,
   wherein the unit diffusion pattern is of a circle, an ellipse, a rectangle, or a rectangular shape having rounded or beveled corners,
   wherein the light sources are LEDs, and
   wherein one side of the unit light guide plate is defined as a light entrance surface, the LEDs are aligned along the light entrance surface, and $p \geq a \geq c$ is satisfied, where a indicates the size of the unit diffusion pattern in a direction orthogonal to an exit optical axis of an LED on a light exit surface of the unit light guide plate, c indicates the size of an LED emission surface in the direction of alignment of the LEDs, and p indicates the pitch of alignment of the LEDs.

2. A backlight apparatus according to claim 1, wherein the pitch of the unit diffusion patterns varies along the direction of from the light entrance surface of the unit light guide plate which light from a light source enters to a tip of the unit light guide plate opposite to the light entrance surface.

3. A backlight apparatus according to claim 1, wherein a plurality of recesses for entering light from the light sources to the unit light guide plates are formed on the light entrance surface of the unit light guide plates, and $W \geq a \geq 0.5 \times e$ is satisfied where W indicates the width of the recess, a indicates the size of the unit diffusion pattern in a direction orthogonal to an exit optical axis of a light source on a light exit surface of the unit light guide plate, and e indicates the pitch of the unit diffusion patterns.

4. A backlight apparatus according to claim 3, wherein the unit diffusion patterns are formed between the plurality of recesses.

5. A backlight apparatus according to claim 1, wherein a diffuser plate for diffusing light from the unit light guide plate is disposed between the unit light guide plates and the liquid crystal panel, and $h \geq a$ is satisfied where h indicates the distance between the light exit surface of the light guide plate and a light entrance surface of the diffuser plate.

6. A backlight apparatus according to claim 1, wherein the unit diffusion pattern is comprised of a rough surface, minute prism sections, minute concave lenses or minute convex lenses.

7. An image display apparatus comprising a plurality of backlight blocks which are aligned, each block having light sources and a unit light guide plate for guiding light from the light sources to the side of a liquid crystal panel, further comprising:

unit diffusion patterns formed on a light exit surface of the unit light guide plate of the backlight block in a staggered alignment; and another diffusion pattern formed on the back of the unit light guide plate, wherein the unit diffusion pattern is of a circle, an ellipse, a rectangle, or a rectangular shape having rounded or beveled corners, wherein the light sources are LEDs, and wherein one side of the unit light guide plate is defined as a light entrance surface, the LEDs are aligned along the light entrance surface, and $p \geqq a \geqq c$ is satisfied, where a indicated the size of the unit diffusion pattern in a direction orthogonal to an exit optical axis of an LED on a light exit surface of the unit light guide plate, c indicates the size of an LED emission surface in the direction of alignment of the LEDs an p indicates the pitch of alignment of the LEDs.

* * * * *